(12) United States Patent
Thinnes (10) Patent No.: US 11,021,764 B2
(45) Date of Patent: Jun. 1, 2021

(54) EXTRACTION DEVICE FOR A TUYERE PART

(71) Applicant: PAUL WURTH S.A., Luxembourg (LU)

(72) Inventor: Claude Thinnes, Kehlen (LU)

(73) Assignee: PAUL WURTH S.A., Luxembourg (LU)

( * ) Notice: Subject to any disclaimer, the term of this patent is extended or adjusted under 35 U.S.C. 154(b) by 0 days.

(21) Appl. No.: 16/639,997

(22) PCT Filed: Aug. 2, 2018

(86) PCT No.: PCT/EP2018/071041
§ 371 (c)(1),
(2) Date: Feb. 18, 2020

(87) PCT Pub. No.: WO2019/034447
PCT Pub. Date: Feb. 21, 2019

(65) Prior Publication Data
US 2020/0385826 A1      Dec. 10, 2020

(30) Foreign Application Priority Data

Aug. 18, 2017   (LU) ........................................ 100373

(51) Int. Cl.
*C21B 7/16*   (2006.01)
*F27B 1/16*   (2006.01)
*F27D 19/00*  (2006.01)

(52) U.S. Cl.
CPC ................ *C21B 7/166* (2013.01); *F27B 1/16* (2013.01); *F27D 19/00* (2013.01)

(58) Field of Classification Search
CPC ............. C21B 7/166; F27B 1/16; F27D 19/00
(Continued)

(56) References Cited

U.S. PATENT DOCUMENTS

| | | |
|---|---|---|
| 3,456,739 A | 7/1969 | Sagae |
| 3,458,918 A | 8/1969 | Daishu et al. |

(Continued)

FOREIGN PATENT DOCUMENTS

| | | |
|---|---|---|
| DE | 1583205 B1 | 9/1971 |
| EP | 0443126 A1 | 8/1991 |

(Continued)

OTHER PUBLICATIONS

JP Office Action dated Aug. 25, 2020 re: Application No. P2020-509106, pp. 1-3, citing: JP S61-183946 U and JP H07-21754 U.

(Continued)

*Primary Examiner* — Scott R Kastler
*Assistant Examiner* — Michael Aboagye
(74) *Attorney, Agent, or Firm* — Cantor Colburn LLP (57) ABSTRACT

Extraction device for extracting a tuyere part, in particular a tuyere or a tuyere cooler, from a shaft furnace, the device including a supporting frame with positioning elements configured to position the device against a furnace wall, a carriage supported by the supporting frame and movable in a direction radial to the furnace wall, an extraction rod having a first end attached to the carriage and a second end for connecting to the tuyere part, where the first end of the extraction rod had a stopper, the device further including a percussion system acting on the stopper of the extraction rod in a direction away from the furnace wall, and a pretensioning mechanism on the supporting frame configured to apply a load to the carriage, in a direction away from the furnace wall.

15 Claims, 3 Drawing Sheets

(58) Field of Classification Search
USPC ..... 266/47, 224, 218, 265, 271, 287; 29/239
See application file for complete search history.

(56) References Cited

U.S. PATENT DOCUMENTS

| | | | | |
|---|---|---|---|---|
| 5,127,633 A | * | 7/1992 | Mailliet | .................. C21B 7/166 |
| | | | | 266/271 |
| 5,925,312 A | * | 7/1999 | Lin | ......................... C21B 7/166 |
| | | | | 266/269 |
| 9,121,077 B2 | * | 9/2015 | Penney | .................. C21B 7/166 |

FOREIGN PATENT DOCUMENTS

| | | | | |
|---|---|---|---|---|
| FR | 002314086 | * | 1/1977 | ............. C21B 7/166 |
| JP | S61183946 | * | 11/1986 | ............. C21B 7/166 |
| JP | S61183946 U | | 11/1986 | |
| JP | H0721754 U | | 4/1995 | |
| SU | 1289886 A1 | | 2/1987 | |
| WO | 2012177964 A2 | | 12/2012 | |

OTHER PUBLICATIONS

International Preliminary Report on Patentability dated Jul. 24, 2019 re: Application No. PCT/EP2018/071041, pp. 1-7, citing: SU 1 289 886 A1.
International Search Report dated Aug. 31, 2018 re: Application No. PCT/EP2018/071041, pp. 1-3, citing: SU 1 289 886 A1 and US 3 456 739 A.
Written opinion dated Aug. 31, 2018 re: Application No. PCT/EP2018/071041, pp. 1-5, citing: SU 1 289 886 A1.

\* cited by examiner

EXTRACTION DEVICE FOR A TUYERE PART

TECHNICAL FIELD

The disclosure relates in general to removal devices for components of a gas injection system or tuyere parts in a blast furnace. The disclosure relates in particular to an extraction device for extracting a tuyere or a tuyere cooler from a blast furnace wall.

BACKGROUND

The maintenance work carried out during the shutdown of a blast furnace generally comprises changing tuyere parts. A tuyere comprises a nozzle through which gases are blown into the furnace. Modern blast furnaces commonly comprise more than 20 such tuyeres all around the furnace wall. The tuyeres are usually inserted into a tuyere cooler comprising a circuit for a cooling fluid. Tuyere and tuyere cooler are tightly pressed into an opening of the furnace wall.

Because of the very harsh conditions in the tuyere breast, the tuyere and often the tuyere cooler can be heavily damaged and may require replacing. The tuyere parts are often burnt or deformed, impeding the normal functioning of the furnace. Their damage may also provoke gas or water leakages outside of the furnace with high risks for the health and safety of the workers around the furnace.

The lifetime of a tuyere varies from several days to several months, which demands recurrent maintenance operation in relatively short intervals of time. In addition, tuyere parts are metal pieces weighting about 100 kg to 1000 kg, making their manual replacement a complicated task. Development of solutions for quicker and safer replacement of the tuyere parts in a blast furnace is hence important in the development of blast furnaces itself.

Solutions have been developed to mechanize and simplify the removal of a tuyere part. Most of them involve either a pulling mechanism or a hammer. Amongst the solutions known in the art, DE 1583205 discloses an apparatus comprising a percussion hammer installed on a trolley with an adjustable height. The trolley is fixed to the furnace wall with bolts. The hammer is provided with gripping means in order to engage with the tip of the tuyere. The hammer may be a regular vibrating electrical hammer.

Another solution is disclosed in EP 0443126, wherein an apparatus for mounting and dismantling a tuyere from a blast furnace comprises a hydraulic piston connected to a shaft. The shaft is provided with a handling element connected to the tuyere. The piston is configured to move the shaft in two directions for either inserting the tuyere into the furnace or removing the tuyere from the furnace.

Further, WO 2012177964 also discloses an apparatus for removing a tuyere from a blast furnace. The apparatus is adapted to be carried by a boom of a small excavator vehicle. The apparatus comprises a hammer activated by the operator of the vehicle. The hammer is also equipped with component handling means for pulling on the tuyere.

Finally, SU 1289886 A1 discloses a device for changing a tuyere nozzle in a blast furnace. The device comprises a carriage and a combination of movable arms to remove an old tuyere and install a new one. The device comprises a member configured to hold the tuyere. In order to fix the member to the tuyere, a technician can turn a dedicated hand wheel. The member further comprises a vibrating hammer actuated to remove the tuyere.

All the solutions of the state of the art share the same disadvantages. They imply heavy installation systems with numerous steps required to set and unset them, thereby slowing down the maintenance operation. They also need to be operated by an operator that will have to stay close to the machine. The operator is consequently exposed to eventual toxic gases released from the furnace.

In addition, when extracting a tuyere part, the fitting between the tuyere part and its holder is often jammed by material from inside the furnace, or just because of the deteriorated state of the parts. The traction force of state of the art pullers is generally not sufficient to extract the tuyere or tuyere cooler out of its conical seat. Even percussion hammers providing percussion power of up to 500 J may not solve this problem. As a result, the tuyere parts often have to be removed manually under risky conditions for health and safety.

BRIEF SUMMARY

It is therefore desirable to provide an improved solution for removing tuyere parts from a blast furnace wall. More particularly, the disclosure provides an improved extraction device with higher extraction strength and better usability.

The disclosure overcomes the above discussed deficiencies and disadvantages by providing an extraction device for extracting a tuyere part, in particular a tuyere or a tuyere cooler, from a shaft furnace, the device comprising a supporting frame with positioning elements configured to position the device against a furnace wall. The disclosure is particularly advantageous when used to remove a jammed part of the tuyere installation. The device also comprises a carriage supported by the supporting frame. The carriage is movable in a direction radial to the furnace wall. The furnace wall is commonly a circular wall so the carriage moves in a direction perpendicular to the wall. The device further comprises an extraction rod having a first end attached to the carriage and a second end for connecting to the tuyere part, wherein the first end of the extraction rod comprises a stopper. The device also comprises a percussion system acting on the stopper of the extraction rod in a direction away from the furnace wall, or a direction radial to the furnace wall with an orientation away from the wall. The percussion system inflicts a sharp blow on the stopper. The device comprises a pretensioning mechanism on the supporting frame. The pretensioning mechanism is configured to apply a load to the carriage, in a direction away from the furnace wall, wherein the load remains substantially constant during an extraction process.

The pretensioning mechanism pushes the carriage away from the furnace wall. As the extraction rod is attached to the carriage, the extraction rod is pushed away from the furnace wall together with the carriage. The force applied to the extraction rod by the pretensioning mechanism is further transmitted to the tuyere part. This force may, in some cases, be sufficient to move the tuyere part out of the wall. If however, the tuyere part cannot be removed from the furnace wall, the pretensioning mechanism maintains the substantially constant pretensioning force, while the percussion system is used to provide further force. The pretensioning mechanism and the percussion system are both automatic mechanism that do not require the close presence of an operator.

As it will be described in details below, to remove the tuyere part, the device is first installed in front of the tuyere by any suitable means, the second end of the extension rod is connected to the tuyere part, then the pretensioning mechanism is activated to apply a substantially constant load to the carriage. If the pretensioning load is not sufficient to pull the tuyere, the percussion system is activated to inflict a sharp blow onto the stopper. The tuyere is removed by a combination of the forces applied by the sharp blow and the pretensioning load.

The extraction device has two mechanisms configured to provide mechanical forces in order to move the tuyere part out of the furnace wall: the pretensioning mechanism, and the percussion system. The combination of the forces provided by these two mechanisms provides a greater extraction force than prior art extraction devices.

An advantage of the disclosure is that the extraction device does not require any complex mechanical components. All the elements of the extraction device may be connected together through common mechanical connections, like bolts or screws. The extraction device is thus very easy to maintain and repair. The disclosure helps reducing the maintenance time and the down time of the shaft furnace.

Moreover, the elements may be quickly replaced in order to adapt the device to a different tuyere part, or to modify the performances of the extraction device when more or less extraction power is required. The extraction device brings flexibility to the tuyere part removal process.

The extraction device according to the disclosure may be moved by a fork lift, but is light enough to be moved using a hand pallet truck.

Advantageously, the percussion system comprises: a striker configured to abut against the stopper of the extraction rod; at least one spring connected between the striker and the carriage; a loading mechanism; and a release mechanism. The at least one spring is configured to bias the striker against the stopper. The loading mechanism is configured to move the striker against the bias of the spring. The release mechanism is configured to engage and disengage the striker with/from the loading mechanism. During the loading phase, the release mechanism is engaged with the striker thereby building up energy in the spring. Upon activation of the release mechanism, the striker is disengaged from the loading mechanism and the buildup of the energy in the spring is suddenly released, allowing the striker to rapidly move towards the stopper of the extraction rod. As the striker hits the stopper, a sudden force is exerted on the extraction rod, which helps the extraction of the tuyere part. The percussion system acts by strikes providing sharp blows and punctual surges of the force applied to the tuyere part in order to remove it. In its main function it is different from a typical vibrating hammer system that relies on a vibrating effect in order to move a tuyere part.

Nevertheless, the loading and release mechanism may be operated alternately to throw the striker against the stopper of the extraction rod. These operations may be repeated as many times as necessary until the tuyere part is extracted from the furnace wall. The release mechanism using the reaction of the spring provides fast acceleration and efficient percussion effect.

The striker may be a cylinder coaxially arranged around the extraction rod. Such a stopper may e.g. have a circular or square base. Other shapers are however also possible. Preferably, the stopper is also a cylinder. In these embodiments, the striker hits the stopper providing a balanced distribution of the forces acting on the end of the extraction rod. The extraction rod is always pushed in the same straight direction, thereby limiting uncontrolled vibrations and potential damage to the extraction device. These embodiments are also advantageous to provide better stability of the connection between the rod and the tuyere part.

Advantageously, the loading mechanism comprises at least one loading actuator. The loading actuator may be a pneumatic actuator. A pneumatic actuator is cheaper, more secure and easier to maintain than for instance a hydraulic actuator.

In preferred embodiments, the release mechanism comprises a hook adapted to engage or disengage the striker. The hook is a simple and reliable solution to quickly connect and disconnect the loading mechanism with/from the striker. It is also easy to repair.

Preferably the hook engages with a radial protrusion on the striker. This solution is again advantageous for its mechanical simplicity, providing quick and easy maintenance.

The hook is advantageously operated by a release actuator. The release actuator is preferably a pneumatic actuator. A pneumatic actuator is sufficiently reliable with the advantages described above.

In preferred embodiments, the pretensioning mechanism comprises at least one pretensioning actuator, which may be a pneumatic actuator. As described above, a pneumatic actuator has numerous advantages. In addition, it is possible to use more than one actuator in order to provide higher pretensioning mechanical forces.

Advantageously, the impact power of the percussion system on the extraction rod is between 1000 J and 1500 J. The impact power results from a combination of the forces applied the pretensioning mechanism and the percussion system. This impact power is superior to the power obtained using state of the art extraction devices and enables the extraction device to extract a tuyere part from a furnace wall even in cases where the tuyere part is heavily jammed inside the wall.

The extraction device may be remotely controlled. There is no action that requires the proximity of an operator once the extraction device is installed against the furnace wall. This reduces health and safety risks for the operator during the extraction of the tuyere part.

In embodiments, the second end of the extraction rod comprises an engagement tool for engaging the tuyere part. The engagement tool may be an exchangeable tool improving the flexibility of the device. The extraction tool may be connected to any surface of the tuyere part or to a complementary part that is specifically created during the design of the tuyere part.

The disclosure also provides a method for extracting a tuyere part, in particular a tuyere or a tuyere cooler, from a shaft furnace. The method comprises the steps of:
  providing an extraction device as described above;
  positioning the extraction device against the furnace wall;
  connecting the extraction rod to the tuyere part;
  operating the pretensioning mechanism to apply a substantially constant pretensioning force to the tuyere part;
  operating the percussion system in order to remove the tuyere part, by inflicting a sharp blow on the stopper, while applying the constant pretensioning force to the carriage.

The method retains all the advantages of the extraction device of the disclosure. The extraction of the tuyere part is performed quickly and does not require the assistance of an operator proximate to the extraction device.

In embodiments, the method is applied using an extraction device comprising a striker; at least one spring; a loading mechanism; and a release mechanism as described above. In these embodiments, the step of operating the percussion system comprises the steps of:

operating the loading mechanism into an engaging position, wherein the release mechanism may engage the striker with the loading mechanism;

operating the release mechanism into a closed position, wherein the striker engages with the loading mechanism;

operating the loading mechanism into a release position, wherein the striker is away from the stopper;

operating the release mechanism into an open position, wherein the striker disengages from the loading mechanism.

If necessary, the step of operating the percussion system may be repeated several times until the tuyere part is detached from the furnace wall and may be removed.

BRIEF DESCRIPTION OF THE DRAWINGS

Further details and advantages of the present disclosure will be apparent from the following detailed description of not limiting embodiments with reference to the attached drawing, wherein.

DETAILED DESCRIPTION

Figure 1:
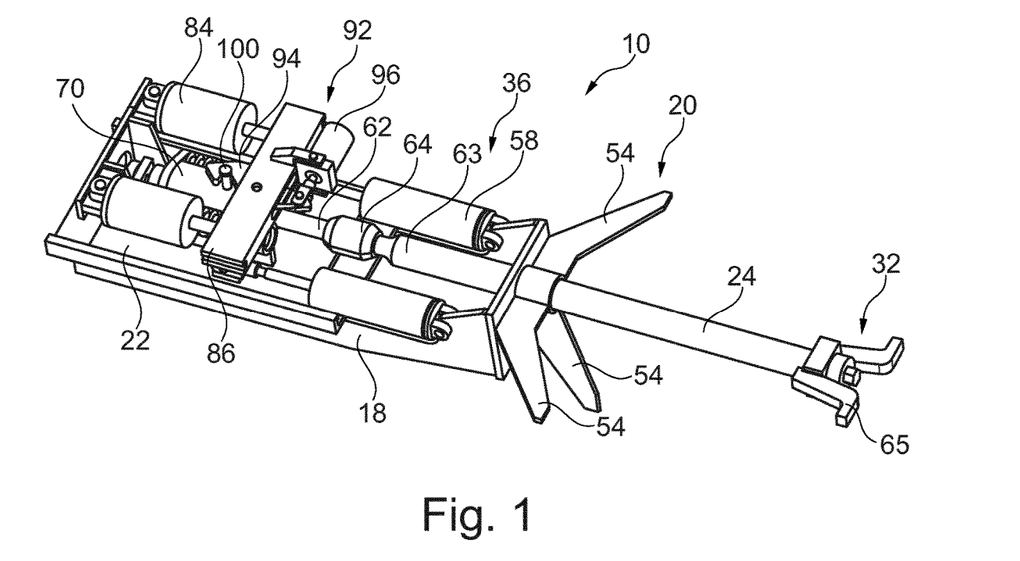
FIG. 1 is a perspective view of an embodiment of an extraction device according to the disclosure.
Figure 2:
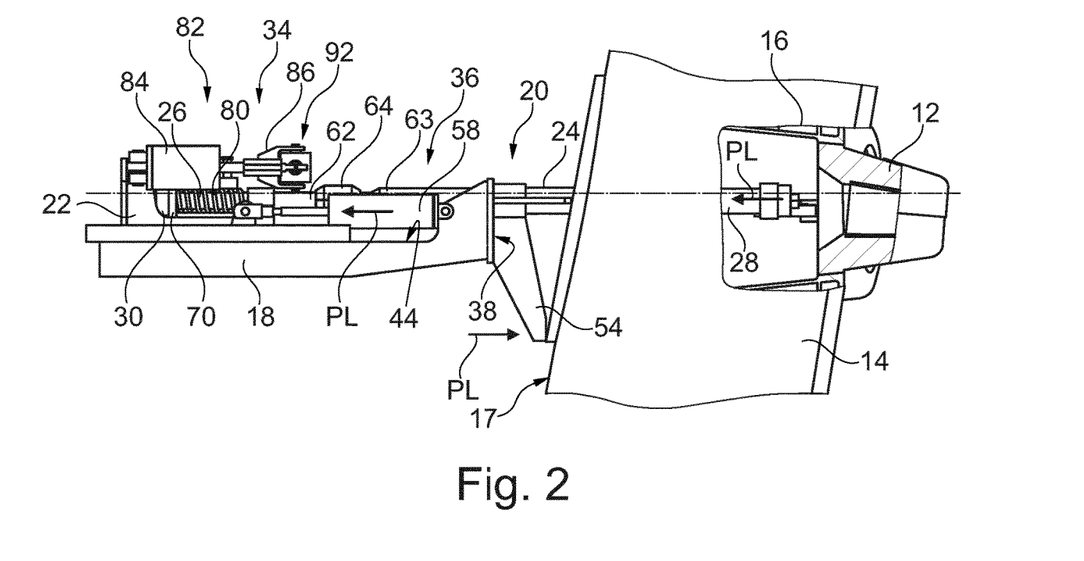
FIG. 2 is a cross-sectional side view of the extraction device of FIG. 1 in a first operational step.
Figure 3:
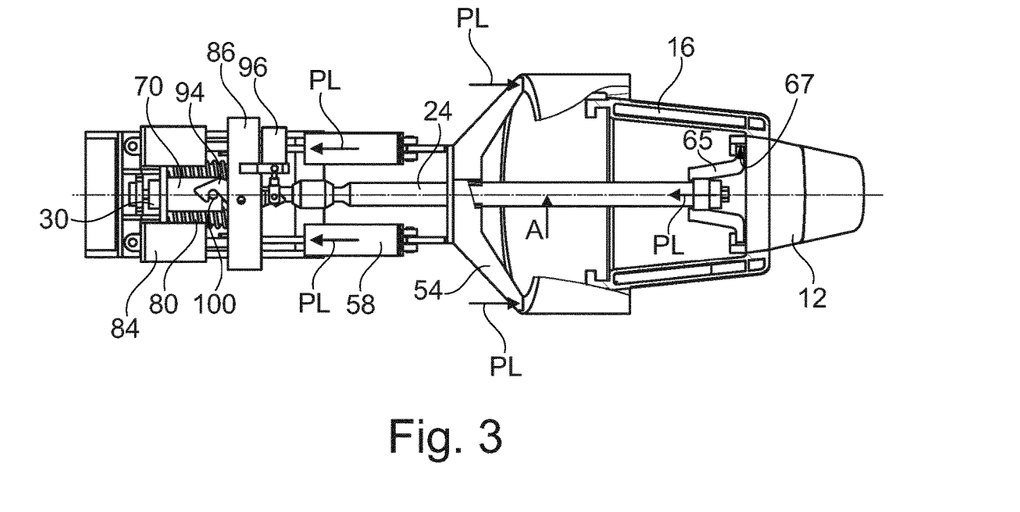
FIG. 3 is a cross-sectional top view of the extraction device of FIG. 1 in a first operational step.

An extraction device 10 according to a preferred embodiment of the disclosure is shown in FIGS. 1 to 3. In a blast furnace, a number of tuyeres 12 are generally located inside the furnace wall 14 in order to feed hot gas into the furnace. In order to remove the tuyere 12, it is necessary to first remove the pipe portions, not shown, that connect to the tuyere 12. These operations are not part of the context of the disclosure. We will here consider that the tuyere is already accessible and that other pipe portions have been preliminarily removed.

The extraction device 10 itself will be described by referring simultaneously to FIGS. 1 to 3. FIGS. 3 to 6 are thereafter used to show operational steps of the extraction device 10 in use.

A tuyere 12 is arranged in a furnace wall 14, usually within a tuyere cooler 16. Both the tuyere 12 and tuyere cooler 16 are securely wedged in a conical seat narrowing in the direction of the interior of the furnace.

In operation, the extraction device 10 is positioned against an exterior surface 17 of the furnace wall 14 so as to access the tuyere 12 to be removed. While, for the sake of conciseness, the present description is limited to the removal of a tuyere 12, it should be noted that the extraction device equally adapted to also remove the tuyere cooler 16 form the furnace wall 14, generally in a separate step.

The extraction device 10 comprises a supporting frame 18 with positioning elements 20 for contacting the exterior surface 17 of the furnace wall 14.

The extraction device 10 also comprises a carriage 22 supported by the supporting frame 18. The carriage 22 is movable in a direction radial to the furnace wall 14. The carriage may comprise wheels, not shown, in order to roll over the supporting frame 18. Alternatively, the carriage 22 may be glidingly arranged on the supporting frame 18.

The extraction device 10 comprises an extraction rod 24, which has a first end 26 attached to the carriage 22 and a second end 28 configured for connecting to the tuyere 12. The first end 26 of the extraction rod 24 comprises a stopper 30, while second end 28 of the extraction rod 24 comprises an engagement tool 32 gripping the tuyere 12 to be removed.

The extraction device 10 further comprises a percussion system 34, acting on the stopper 30 of the extraction rod 24 in a direction away from the furnace wall 14.

Finally, the extraction device 10 comprises a pretensioning mechanism 36 on the supporting frame 18. The pretensioning mechanism 36 is configured to apply a mechanical load to the carriage 22, in a direction away from the furnace wall 14.

The supporting frame 18 may be a metallic casing that is adapted to support the other elements of the device 10. The supporting frame 18 comprises a vertical front face 38 oriented in direction of the furnace wall 14, the front face 38 having the positioning elements 20 connected thereto, and a top face 44 carrying the carriage 22.

The top face 44 of the supporting frame 18 comprises an essentially horizontal plane on which the carriage 22 is movably arranged. The carriage 22 may comprise wheels (not shown) which engage with rails (not shown) arranged on the top face 44 of the supporting frame 18.

Fixed to the front face 38 of the supporting frame 18, the positioning element 20 comprises three metallic feet 54 adapted to contact the furnace wall 14. In the embodiments shown, when the device 10 is positioned on the furnace wall 14, two of the metallic feet 54 may be on a same horizontal plan on each side of the device 10 and the third one may be below the others, creating a T configuration. The positioning element 20 impedes a rotation or translation movement of the device 10 in operation. Other configurations of the metallic feet may be envisaged. Indeed, the three metallic feet may be equidistantly arranged. More than three feet may be provided.

The positioning element 20 is preferably removably fixed to the front face 38, e.g. by screws or similar means. The positioning element 20 may then be replaced to adapt to the configuration of another furnace wall, making the device customizable.

In the embodiment shown, the pretensioning mechanism 36 comprises two pretensioning actuators 58. The pretensioning actuators 58 are two pneumatic pistons fixed between the supporting frame 18 and the carriage 22 such that, when the pretensioning actuators 58 are extended, the carriage 22 is pushed away from the furnace wall 14. Inversely, a retraction of the pretensioning actuators 58 pulls the carriage 22 in the direction of the furnace wall 14.

The connection between the pretensioning actuators 58 and the supporting frame 18, as well as the connection between the pretensioning actuators 58 and the carriage 22 may be formed by any suitable means.

In preferred embodiments, the pretensioning actuators 58 are dimensioned to apply a pushing mechanical load on the carriage between 1.2 and 2.0 to.

The carriage 22 has the first end 26 of the extraction rod 24 connected thereto. Thus, as the pretensioning actuators 58 exert a force on the carriage 22 in a direction away from the furnace wall 14, the same force is also exerted on the extraction rod 24 connected with its second end to the tuyere 12. Consequently, the force exerted on the carriage 22 is also transferred, via the extraction rod 24, to the tuyere 12.

The extraction rod 24 may be removably connected to the carriage 22, e.g. by means of screws, thereby allowing for the extraction rod 24 to be exchangeable. Alternatively, the extraction rod 24 may comprise a first rod portion 62 connected to the carriage 22 and a second rod portion 63 removably connected to the first rod portion 62 via a connector portion 64. Thus, the second rod portion 63 is exchangeable. The connector portion 64 may connect the second rod portion 63 to the first rod portion 62 by means of e.g. a screw fit or bayonet fit. Such a connector portion 64 allows to the second rod portion 63 to be quickly exchanged. This may be of importance if a second rod portion 63 or the engagement tool 32 has become damaged. Also, it may be replaced with a second rod portion 63 having a different engagement tool, better adapted for removing a different tuyere part such as e.g. a tuyere cooler 16.

As explained above, the second end 28 of the extraction rod 24 comprises an engagement tool 32 with a plurality of engagement arms 65. The engagement arms 65 are designed to be inserted in a complementary arm receiver 67 of the tuyere 12. This way, a movement of the extraction rod 24 in a direction away from the furnace wall 14 provokes a movement of the tuyere 12 in the same direction.

The carriage 22 further carries the percussion system 34 comprising striker 70 configured to abut against the stopper 30 of the extraction rod 24. The percussion system 34 comprises a loading mechanism 82 configured to move the striker 70 against the bias of preferably at least two springs 80 away from the stopper 30.

To this effect, the loading mechanism 82 comprises two loading actuators 84. The loading actuators 84 may be pneumatic pistons; hydraulic pistons or any other actuator may however also be used.

The loading actuators 84 are operatively connected between the carriage 22 and a common loading bar 86.

In preferred embodiments, the loading actuators 84 are dimensioned to exert a pushing load on the loading bar 86 between 2.0 and 3.5 to.

The striker 70 is preferably formed by a striking cylinder coaxially arranged around the extraction rod 24. The striker 70 is configured to translate along the extraction rod 24. The striker 70 may for example weigh abound 40 to 50 kg.

Two springs 80 are mounted between the striker 70 and the carriage 22. The springs 80 are preferably heavy duty helical springs. The springs 80 are configured to bias the striker 70 against the stopper 30.

In preferred embodiments, the springs are dimensioned to apply a pushing mechanical load on the striker between 2.0 and 3.5 to.

The percussion system 34 further comprises a release mechanism 92 configured to engage and disengage the striker 70 with/from the loading mechanism 82.

The release mechanism 92 is mounted on the loading bar 86 of the loading mechanism 82 and comprises a hook 94 and a release actuator 96. The hook 94 is adapted to engage or disengage with a radial protrusion 100 on the striker 70. The hook 94 projects on one side of the loading bar 86 with a shape configured to engage with the protrusion 100 so as to block a translation of the striker 70 along the extraction rod 24 relative to the hook 94. The hook 94 also projects on the other side of the loading bar 86 where it is connected to the release actuator 96.

The release actuator 96 may be a pneumatic actuator, and more particularly a pneumatic piston.

The release actuator 96 is connected the hook 94 such that the translational movement of the piston 96 rotates the hook 96 like a lever in order to engage or disengage with/from the striker 70.

In the following description, the functioning of the extraction device 10 will be explained with regard to FIGS. 3 to 6.

In order to remove the tuyere 12 from the tuyere cooler 16, the extraction device 10 is first brought in front of the tuyere 12. The extraction device 10 may have an estimated total weight of about 1300 kg and may be carried on a forklift or a hand pallet truck to be easily manipulated in the surroundings of the furnace. Once the extraction device 10 is in front of the conical seat, the extraction rod 24 is inserted in the furnace wall 14. During that step, the pistons 58 of the pretensioning mechanism 36 are in a retracted position.

The engagement arms 65 of the engagement tool 32 are connected with a respective arm receiver 67 of the tuyere 12. The step of connecting the engagement tool to the tuyere may comprise more intermediary maneuvers depending on the configuration of the engagement tool 32.

FIG. 3 shows the extraction device 10 in a first operational step, wherein the pistons 58 of the pretensioning mechanism 36 are in extended position and the three feet 54 of the positioning element 20 are against the furnace wall 14 with the extraction rod 24 engaged in the tuyere 12. Control of the extraction device 10 is achieved by operating the pneumatic actuators mentioned above. The extraction device 10 may comprise a controller in order to be remotely operated and no operator is required around the extraction device 10, reducing the risks for human health and safety.

A substantially constant pretensioning force is then applied by the pretensioning actuators 58 pushing the carriage 22 away from the furnace wall 14. FIG. 3 shows arrows PL representing the pretensioning forces applied on the carriage 22, the tuyere 12, and the reaction of the metallic feet 54 against the furnace wall 14. We note that the two pretensioning actuators 58 are operated simultaneously applying a total force of 1.2-2.0 to against the tuyere 12.

In the figures, all arrows representing forces are only schematically represented to improve the understanding of the functioning of the extraction device 10.

The resulting pretensioning force PL may in some cases be sufficient to remove the tuyere 12 from the furnace wall. Experience as shown however that, due to the state of the tuyere and the harsh conditions inside the furnace, the fitting between the tuyere 12 and the tuyere cooler 16 is often jammed and the force applied by the pretensioning mechanism alone is not sufficient to extract the tuyere 12.

In the following steps, shown in FIGS. 4 to 6, the percussion system 34 is operated. During the successive steps of the extraction, the pretensioning mechanism continues to apply a load PL to the carriage. At the beginning of this step, the loading mechanism 82 is in an engaging position.

Figure 4:
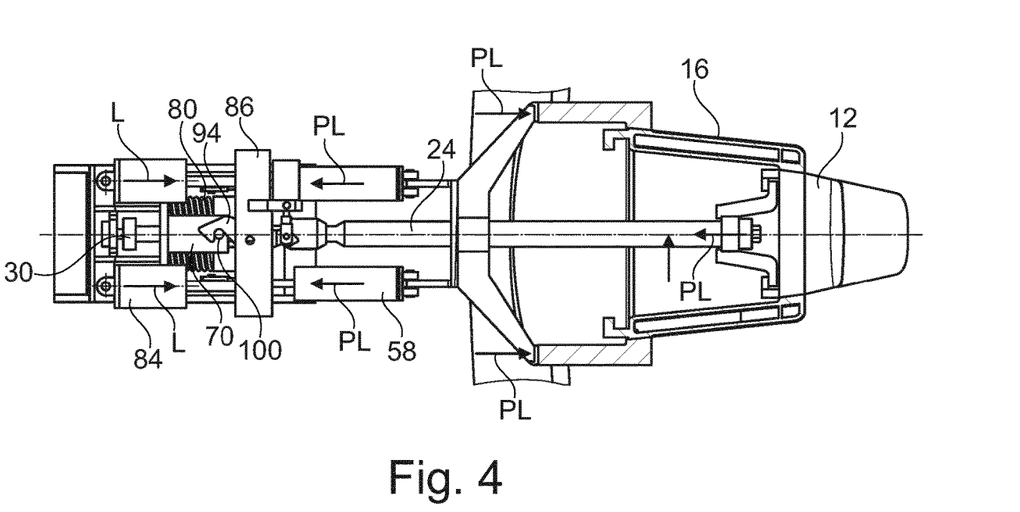
FIG. 4 is a cross-sectional top view of the extraction device of FIG. 1 in a second operational step.
Figure 5:
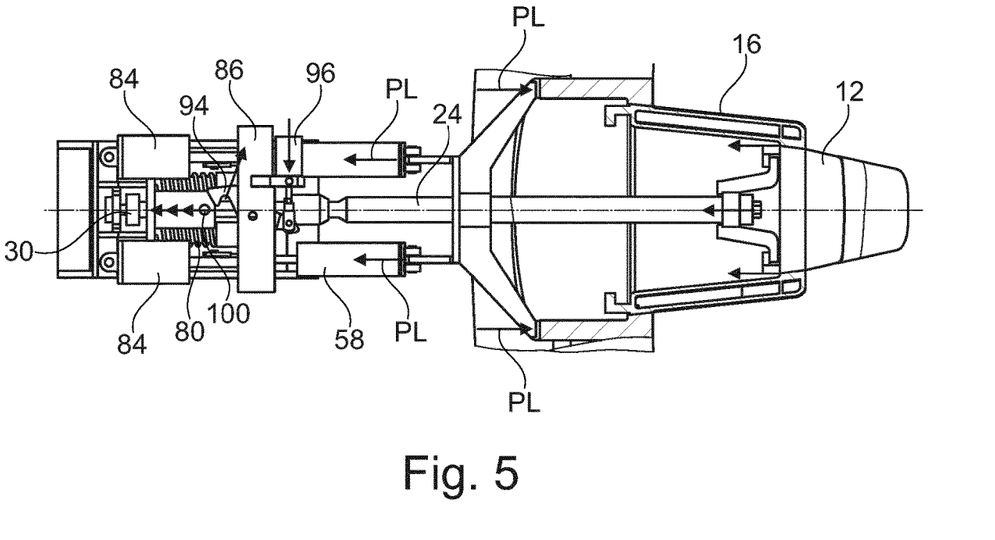
FIG. 5 is a cross-sectional top view of the extraction device of FIG. 1 in a third operational step.

First, as shown in FIG. 4, the loading mechanism 82 is operated. The percussion system 34 is operated with the release mechanism 92 in a closed position, wherein the hook 94 engages the radial protrusion 100 of the striker 70.

The loading mechanism 82 is controlled to extend the loading actuators 84 and thereby push the loading bar 86 away from the stopper 30. The loading forces are represented by arrows L. As the release mechanism 92 is in the closed position, the striker 70 is driven away from the stopper 30, against the bias of the springs 80. Here again, the two loading actuators 84 are operated simultaneously.

Once the loading mechanism 82 has reached its release position, which may e.g. be defined by the maximum extension of the loading actuators 84 or the maximum allowed compression of the springs 80 by mechanical stopper, operation of the loading mechanism 82 is stopped.

The release mechanism 92 is now operated by activating the release actuator 96 which moves the hook 94 into an open position so as to disengage from the radial protrusion 100 of the striker 70. The hook 94 disengages from the radial protrusion 100 and releases the connection between the release mechanism 92 and the striker 70. The springs 80 are allowed to move back to their resting position, thereby thrusting the striker 70 towards the stopper 30 as shown in FIG. 5.

Figure 6:
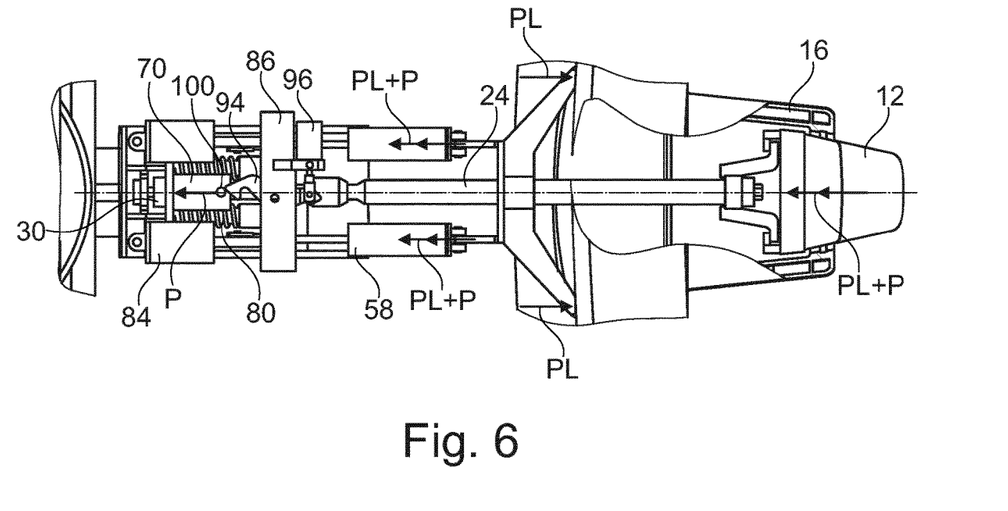
FIG. 6 is a cross-sectional top view of the extraction device of FIG. 1 in a fourth operational step.

When the striker 70 hits the stopper 30 in a sharp blow as shown in FIG. 6, a percussion force P is transmitted from the stopper 30 to the extraction rod 24 and via the engagement tool 32, to the tuyere 12. The sharp blow creates a sudden and instantaneous increase in the pulling force applied to the tuyere 12 by the combination of the pretensioning force and the percussion force, represented by an arrow PL+P in FIG. 6.

The resulting combination force PL+P provokes a small movement of the tuyere 12 in the direction of the extraction device 10. As the pretensioning force PL is continuously applied by the pretensioning pistons 58, if the tuyere 12 is freed from the tuyere cooler 16, the pretensioning pistons 58 may continue to move the carriage 22 away from the furnace wall 14, thus extracting the tuyere 12. In case the tuyere 12 remains wedged in the tuyere cooler 16, the percussion system 34 may be operated again.

In order to operate the percussion system 34 again, the loading actuators 84 of the loading mechanism 82 are retracted back to the engaging position, bringing the hook 94 closer to the radial protrusion 100 of the striker 70. The release actuator 96 rotates the hook 94 in the opposite direction as above into the closed position. The hook 94 thus engages with the radial protrusion 100 of the striker 70. The device 10 is now in a similar configuration as shown in FIG. 3.

The steps of operating the percussion system 34 may be repeated as many times as necessary until the tuyere 12 is fully extracted from the tuyere cooler 16. The recurring percussion may also create a vibration effect applied after each successive release of the striker 70.

For example the frequency of the percussion may be about 8 hits per minute at an operating piston pressure of 4 bar(g), or 12 hits per minute at 6 bar(g).

Using the combination of the pretensioning mechanism 58 and the percussion system 34, the extraction device 10 achieves greater extraction forces to a tuyere or tuyere cooler than the solutions currently known in the art.

The invention claimed is:

1. An extraction device for extracting a tuyere part from a shaft furnace, the device comprising:
    a supporting frame with a positioning element configured to position the extraction device against a furnace wall;
    a carriage supported by the supporting frame, said carriage being movable in a direction radial to the furnace wall;
    an extraction rod having a first end attached to the carriage and a second end for connecting to the tuyere part, wherein the first end of the extraction rod comprises a stopper;
    a percussion system configured to act on the stopper of the extraction rod in a direction away from the furnace wall in order to inflict a sharp blow on the stopper; and
    a pretensioning mechanism on said supporting frame, the pretensioning mechanism being configured to apply a substantially constant load to the carriage, in a direction away from the furnace wall.

2. An extraction device according to claim 1, wherein the percussion system is attached to the carriage.

3. An extraction device according to claim 1, wherein the percussion system comprises:
    a striker, configured to abut against the stopper of the extraction rod;
    a spring connected between the striker and the carriage, the spring being configured to bias the striker against the stopper;
    a loading mechanism configured to move the striker against the bias of the spring; and
    a release mechanism configured to engage and disengage the striker with/from the loading mechanism.

4. An extraction device according to claim 3, wherein the striker is a cylinder coaxially arranged around the extraction rod.

5. An extraction device according to claim 3, wherein the loading mechanism comprises a loading actuator, said loading actuator being a pneumatic actuator.

6. An extraction device according to claim 3, wherein the release mechanism comprises a hook adapted to engage or disengage the striker.

7. An extraction device according to claim 6, wherein the hook engages with a radial protrusion on the striker.

8. An extraction device according to claim 6, wherein the hook is operated by a release actuator, said release actuator being a pneumatic actuator.

9. An extraction device according to claim 1, wherein the pretensioning mechanism comprises a pretensioning actuator, said pretensioning actuator being a pneumatic actuator.

10. An extraction device according to claim 1, wherein the impact power of the percussion system on the extraction rod is between 1000 J and 1500 J.

11. An extraction device according to claim 1, wherein the extraction device comprises a controller in order to remotely control the extraction device.

12. An extraction device according to claim 1, wherein the second end of the extraction rod comprises an engagement tool for engaging the tuyere part.

13. A method for extracting a tuyere part from a shaft furnace, the method comprising the steps of:
    providing an extraction device according to claim 1;
    positioning the extraction device against the furnace wall;
    connecting the extraction rod to the tuyere part;
    operating the pretensioning mechanism to apply a substantially constant pretensioning force to the tuyere part; and
    operating the percussion system in order to remove the tuyere part, by inflicting a sharp blow on the stopper, while applying the constant pretensioning force.

14. A method according to claim 13, wherein the step of operating the percussion system comprises the steps of:
    operating the loading mechanism into an engaging position, wherein the release mechanism may engage the striker with the loading mechanism;
    operating the release mechanism into a closed position, wherein the striker engages with the loading mechanism;
    operating the loading mechanism into a release position, wherein the striker is away from the stopper; and
    operating the release mechanism into an open position, wherein the striker disengages from the loading mechanism.

15. A method according to claim 13, wherein the step of operating the percussion system is repeated.

* * * * *